United States Patent
Major et al.

(10) Patent No.: US 10,412,464 B2
(45) Date of Patent: *Sep. 10, 2019

(54) ADAPTIVE MULTICAST DELIVERY OF MEDIA STREAMS

(71) Applicant: Echostar Technologies LLC, Englewood, CO (US)

(72) Inventors: Robert Drew Major, Orem, UT (US); Mark B. Hurst, Cedar Hills, UT (US); Herrick Muhlestein, Englewood, CO (US)

(73) Assignee: Dish Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/649,367

(22) Filed: Jul. 13, 2017

(65) Prior Publication Data

US 2017/0311048 A1    Oct. 26, 2017

Related U.S. Application Data

(63) Continuation of application No. 14/144,235, filed on Dec. 30, 2013, now Pat. No. 9,716,916.

(Continued)

(51) Int. Cl.
*H04N 7/173* (2011.01)
*H04N 21/647* (2011.01)
(Continued)

(52) U.S. Cl.
CPC ... *H04N 21/64738* (2013.01); *H04L 65/4076* (2013.01); *H04L 65/602* (2013.01);
(Continued)

(58) Field of Classification Search
None
See application file for complete search history.

(56) References Cited

U.S. PATENT DOCUMENTS

| 5,935,206 A | 8/1999 | Dixon et al. |
| 6,195,680 B1 | 2/2001 | Goldszmidt et al. |

(Continued)

FOREIGN PATENT DOCUMENTS

| WO | 2007030813 A2 | 3/2007 | |
| WO | WO-2009035466 A1 * | 3/2009 | ........... H04N 5/4401 |
| WO | 2011034955 A2 | 3/2011 | |

OTHER PUBLICATIONS

USPTO, Notice of Allowance dated Mar. 4, 2014 for U.S. Appl. No. 13/707,031.

(Continued)

*Primary Examiner* — William J Kim
(74) *Attorney, Agent, or Firm* — Lorenz & Kopf PPL (57) ABSTRACT

Various systems, methods and devices adaptively manage the multicast delivery of multiple media programs. Each of the media programs is encoded into multiple media streams, each stream having a different bitrate, frame rate, resolution or other encoding parameter. A computer receives feedback about the delivery of the multiple streams and automatically adapts the number of streams available for at least one of the multiple media programs in response to the received feedback. This allows resources to be applied to those multicast streams having the greatest user demand.

20 Claims, 3 Drawing Sheets

Related U.S. Application Data (60) Provisional application No. 61/746,776, filed on Dec. 28, 2012.

(51) Int. Cl.
*H04N 21/643* (2011.01)
*H04L 29/06* (2006.01)
*H04N 21/2343* (2011.01)
*H04N 21/6405* (2011.01)
*H04N 21/6408* (2011.01)
*H04N 21/845* (2011.01)

(52) U.S. Cl.
CPC ..... *H04N 21/23439* (2013.01); *H04N 21/643* (2013.01); *H04N 21/6405* (2013.01); *H04N 21/6408* (2013.01); *H04N 21/64322* (2013.01); *H04N 21/8456* (2013.01)

(56) References Cited

U.S. PATENT DOCUMENTS

| | | | | |
|---|---|---|---|---|
| 6,973,081 | B1* | 12/2005 | Patel | H04L 12/1881 370/390 |
| 7,474,832 | B2 | 1/2009 | Boston et al. | |
| 7,584,495 | B2 | 9/2009 | Hannuksela et al. | |
| 7,603,022 | B2 | 10/2009 | Putterman et al. | |
| 7,624,412 | B2 | 11/2009 | McEvilly et al. | |
| 7,739,239 | B1 | 6/2010 | Cormie et al. | |
| 7,770,200 | B2 | 8/2010 | Brooks et al. | |
| 8,181,206 | B2 | 5/2012 | Hasek | |
| 8,238,725 | B2 | 8/2012 | Demas et al. | |
| 8,532,171 | B1* | 9/2013 | Narayanan | H04N 21/8451 375/240.01 |
| 8,681,680 | B2 | 3/2014 | Mao et al. | |
| 8,787,975 | B2 | 7/2014 | Kanojia et al. | |
| 9,071,484 | B1* | 6/2015 | Truax | H04L 29/06027 |
| 9,100,700 | B2 | 8/2015 | Major et al. | |
| 2002/0046405 | A1* | 4/2002 | Lahr | H04L 29/06027 725/87 |
| 2003/0204519 | A1 | 10/2003 | Sirivara et al. | |
| 2003/0208767 | A1 | 11/2003 | Williamson et al. | |
| 2005/0002337 | A1 | 1/2005 | Wang et al. | |
| 2005/0191033 | A1 | 9/2005 | Ishido | |
| 2005/0233694 | A1 | 10/2005 | Enari et al. | |
| 2005/0275752 | A1 | 12/2005 | Li et al. | |
| 2005/0289618 | A1 | 12/2005 | Hardin | |
| 2006/0020984 | A1 | 1/2006 | Ban et al. | |
| 2006/0053078 | A1 | 3/2006 | Yamamoto et al. | |
| 2006/0117090 | A1 | 6/2006 | Schellingerhout et al. | |
| 2007/0036516 | A1 | 2/2007 | Kahn et al. | |
| 2007/0083667 | A1* | 4/2007 | Cooper | H04L 12/185 709/231 |
| 2007/0107019 | A1 | 5/2007 | Romano et al. | |
| 2007/0118857 | A1 | 5/2007 | Chen et al. | |
| 2007/0124245 | A1 | 5/2007 | Sato et al. | |
| 2008/0013919 | A1 | 1/2008 | Boston et al. | |
| 2008/0092168 | A1 | 4/2008 | Logan et al. | |
| 2008/0127284 | A1 | 5/2008 | Kouniniotis | |
| 2008/0201748 | A1 | 8/2008 | Hasek et al. | |
| 2008/0310825 | A1 | 12/2008 | Fang et al. | |
| 2009/0025027 | A1* | 1/2009 | Craner | H04H 20/103 725/32 |
| 2009/0043906 | A1* | 2/2009 | Hurst | H04N 21/23439 709/231 |
| 2009/0074380 | A1 | 3/2009 | Boston et al. | |
| 2009/0080582 | A1 | 3/2009 | Loeffler et al. | |
| 2009/0080864 | A1 | 3/2009 | Rajakarunanayake | |
| 2009/0144285 | A1 | 6/2009 | Chatley et al. | |
| 2009/0144416 | A1 | 6/2009 | Chatley et al. | |
| 2009/0187948 | A1 | 7/2009 | Malik | |
| 2009/0265426 | A1 | 10/2009 | Svendsen et al. | |
| 2009/0282162 | A1 | 11/2009 | Mehrotra et al. | |
| 2010/0114921 | A1 | 5/2010 | Bocharov et al. | |
| 2010/0131671 | A1 | 5/2010 | Kohli et al. | |
| 2010/0153227 | A1 | 6/2010 | Medvinsky et al. | |
| 2010/0153237 | A1 | 6/2010 | LaJoie et al. | |
| 2010/0242079 | A1 | 9/2010 | Riedl et al. | |
| 2010/0250549 | A1 | 9/2010 | Muller et al. | |
| 2010/0319044 | A1 | 12/2010 | Agans et al. | |
| 2011/0035507 | A1 | 2/2011 | Brueck et al. | |
| 2011/0083144 | A1 | 4/2011 | Bocharov et al. | |
| 2011/0107379 | A1* | 5/2011 | Lajoie | H04L 65/1016 725/87 |
| 2011/0126248 | A1* | 5/2011 | Fisher | H04N 7/17318 725/95 |
| 2011/0138431 | A1 | 6/2011 | Cedervall et al. | |
| 2011/0173345 | A1 | 7/2011 | Knox et al. | |
| 2011/0188439 | A1* | 8/2011 | Mao | H04N 7/17318 370/312 |
| 2011/0225315 | A1 | 9/2011 | Wexler et al. | |
| 2011/0296048 | A1 | 12/2011 | Knox et al. | |
| 2012/0054312 | A1 | 3/2012 | Salinger | |
| 2012/0079546 | A1 | 3/2012 | Kalidindi et al. | |
| 2012/0128061 | A1* | 5/2012 | Labrozzi | H04N 21/234354 375/240.02 |
| 2012/0144302 | A1 | 6/2012 | Campanotti et al. | |
| 2012/0219273 | A1 | 8/2012 | McWilliams | |
| 2012/0293605 | A1 | 11/2012 | Seferian et al. | |
| 2012/0317655 | A1 | 12/2012 | Zhang et al. | |
| 2012/0324489 | A1 | 12/2012 | Greenfield | |
| 2012/0331106 | A1 | 12/2012 | Ramamurthy et al. | |
| 2013/0013688 | A1 | 1/2013 | Wang et al. | |
| 2013/0013704 | A1 | 1/2013 | Pope et al. | |
| 2013/0089142 | A1 | 4/2013 | Begen et al. | |
| 2013/0097309 | A1 | 4/2013 | Ma et al. | |
| 2013/0111606 | A1 | 5/2013 | Gu | |
| 2013/0142499 | A1 | 6/2013 | Major et al. | |
| 2013/0145392 | A1 | 6/2013 | Major et al. | |
| 2013/0145408 | A1 | 6/2013 | Major et al. | |
| 2013/0145410 | A1 | 6/2013 | Major et al. | |
| 2013/0145411 | A1 | 6/2013 | Major et al. | |
| 2013/0145415 | A1 | 6/2013 | Major et al. | |
| 2013/0159544 | A1 | 6/2013 | Cooper | |
| 2013/0254341 | A1 | 9/2013 | Ramakrishnan | |
| 2013/0254538 | A1 | 9/2013 | Orsini et al. | |
| 2014/0189099 | A1 | 7/2014 | Hurst et al. | |
| 2014/0189143 | A1 | 7/2014 | Muhlestein | |
| 2014/0237534 | A1 | 8/2014 | Salinger et al. | |
| 2014/0250473 | A1 | 9/2014 | Braness et al. | |
| 2014/0317652 | A1 | 10/2014 | Tam | |

OTHER PUBLICATIONS

USPTO, Final Office Action dated Mar. 12, 2014 for U.S. Appl. No. 13/707,044.
USPTO, Final Office Action dated Mar. 13, 2014 for U.S. Appl. No. 13/707,022.
USPTO, Non-final Office Action dated Mar. 6, 2014 for U.S. Appl. No. 13/706,983.
European Patent Office, International Search Report and Written Opinion, dated Apr. 17, 2014 for International Application No. PCt/US2013/078358.
Wikipedia, the free encyclopeida, Adaptive Bitrate Streaming, Sep. 24, 2014; retrieved from the Internet at http://en.wikipedia.org/w/index.php?title=Adaptie_bitrate_streaming@oldid=528192400.
U.S. Patent and Trademark Office, Notice of Allowance, dated May 23, 2014 for U.S. Appl. No. 13/707,044.
U.S. Patent and Trademark Office, Notice of Allowance, dated May 27, 2014 for U.S. Appl. No. 13/707,022.
USPTO, "Office Action" dated Aug. 21, 2014 for U.S. Appl. No. 13/706,993.
USPTO, "Notice of Allowance and Fee(s) Due" dated Aug. 25, 2014 for U.S. Appl. No. 13/706,983.
U.S. Patent and Trademark Office, Non-Final Office Action, dated Oct. 9, 2014 for U.S. Appl. No. 13/837,058.
U.S. Patent and Trademark Office, Non-Final Office Action, dated Nov. 3, 2014 for U.S. Appl. No. 13/707,008.
U.S. Patent and Trademark Office, Notice of Allowance, dated Nov. 6, 2014 for U.S. Appl. No. 13/706,983.

(56) References Cited

OTHER PUBLICATIONS

USPTO, Notice of Allowance and Fee(s) Due for U.S. Appl. No. 13/837,058 dated Feb. 3, 2015.
USPTO, Notice of Allowance and Fee(s) Due for U.S. Appl. No. 13/706,993 dated Feb. 27, 2015.
USPTO, Notice of Allowance and Fee(s) Due for U.S. Appl. No. 13/707,008 dated Mar. 4, 2015.
The International Bureau of WIPO, International Preliminary Report on Patentability for International Application No. PCT/US2013/078358 dated Jul. 9, 2015.
USPTO, Office Action for U.S. Appl. No. 14/145,115 dated Aug. 21, 2015.
USPTO, Office Action in U.S. Appl. No. 14/792,485 dated Dec. 18, 2015.
USPTO Notice of Allowance, U.S. Appl. No. 14/792,485, dated May 4, 2016.
Anonymous, "Text of ISO/IEC 2nd DIS 23009-1 Dynamic Adaptive Streaming over HTTP", 97, MPEG Meeting; Jul. 18, 2011-Jul. 22, 2011; Torino; (Motion Picture Expert Group OR ISO/IEC JTC1/SC29/WG11), No. N12166, Sep. 6, 2011.
EPO Search Report, EP Application No. 12801787.8, dated Jun. 6, 2016.
Non-Final Office Action, U.S. Appl. No. 15/247,147, dated Feb. 8, 2017.
Microsoft, How NTFS Works, Mar. 28, 2003, http://technet.microsoft.com/en-us/library/cc781134(v=ws.10).aspx.
T. Berners-Lee, "Hypertext Transfer Protocol—HTTP/1.1," Jun. 1999; retrieved from the Internet on Apr. 10, 2013 from http://www.w3.org/protocols, Chapters 5, 6, and 10.
European Patent Office "International Search Report and Written Opinion" dated Jun. 7, 2013 for International Appln. No. PCT/US2012/067796.
U.S. Patent and Trademark Office, Non-Final Office Action, dated Sep. 13, 2013 for U.S. Appl. No. 13/707,008.
U.S. Patent and Trademark Office, Non-Final Office Action, dated Sep. 20, 2013 for U.S. Appl. No. 13/707,022.
U.S. Patent and Trademark Office, Non-Final Office Action, dated Sep. 25, 2013 for U.S. Appl. No. 13/707,031.
U.S. Patent and Trademark Office, Non-Final Office Action, dated Oct. 2, 2013 for U.S. Appl. No. 13/707,044.
U.S. Patent and Trademark Office, Final Office Action dated Jan. 15, 2014 for U.S. Appl. No. 13/707,008.
U.S. Patent and Trademark Office, Office Action dated Sep. 10, 2013 for U.S. Appl. No. 13/706,983.
U.S. Patent and Trademark Office, Final Office Action dated Jan. 10, 2014 for U.S. Appl. No. 13/706,983.

\* cited by examiner

ADAPTIVE MULTICAST DELIVERY OF MEDIA STREAMS

PRIORITY CLAIM

This application claims priority to U.S. Provisional Application Ser. No. 61/746,776 filed on Dec. 28, 2012, which is incorporated herein by reference.

TECHNICAL FIELD

The present disclosure generally relates to multicasts of media streams, and more particularly relates to systems, devices and methods to adaptively provide multicasts of media segment streams.

BACKGROUND

Streaming media is becoming more and more popular with consumers. At present, a variety of streaming audio, video and/or other media content is available to consumers from any number of diverse unicast and multicast sources. So-called "Internet television", for example, is typically provided as a multicast stream using conventional Internet protocols. Media streams are also used to provide other types of network-based media content, as well as live and pre-recorded broadcast television, content-on-demand, stored media content (e.g., content stored in a remotely-located digital video recorder (DVR), placeshifted media content and the like.

Often, media content is encoded into multiple sets of "streamlets" or other smaller segment files that can be individually requested and adaptively delivered to a particular client device. As changes in network bandwidth or other factors occur, the client device is able to react to the changes by requesting future segments that are encoded with different parameters (e.g., a higher or lower bit rate). Several examples of adaptive streaming systems and techniques are described in US Patent Publication No. 2008/0195743, which is incorporated herein by reference.

While this adaptability does allow a relatively flexible form of media delivery, it can create challenges because multiple copies of each program typically need to be made available to the client at the same time. That is, the client needs to be able to switch between high-bandwidth or lower bandwidth streams on relatively short notice, so both high and low bandwidth streams need to be readily available. Often, more than two streams are provided for each program so that the client application has more options in selecting the appropriate bandwidth for the then-current conditions. Providing the multiple copies of each program stream can quickly consume available resources such as network bandwidth, encoder capabilities, storage space on a file server, and the like.

The resource consumption issue is quickly compounded in the multi-cast setting where multiple users simultaneously receive the same content, since the differently-encoded copies of the same program all need to be made available to each of the different users at the same time. It is therefore desirable to create systems and methods to reliably and conveniently manage available resources while providing multiple multicast media streams to customers. These and other desirable features and characteristics will become apparent from the subsequent detailed description and the appended claims, taken in conjunction with the accompanying drawings and this background section.

BRIEF SUMMARY

Various exemplary embodiments provide client or server systems, processing devices and/or techniques to adaptively manage the multicast delivery of multiple media programs. Typically, each of the media programs is encoded into a plurality of media streams, each stream having different encoding parameters than the other streams of the same media program. Real-time or other feedback information about the delivery of the multiple media programs is received, and the number of streams available for at least one of the multiple media programs is adapted in response to the received feedback. Some implementations may receive the feedback information in real time so that changes in the available streams can be made in response to changing network conditions, changing viewer demand, and/or other factors as desired. This allows network resources to be efficiently allocated where they can provide the most benefit for the most users.

Various embodiments, aspects and other features are described in detail below.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

As noted above, reliable multicast delivery of adaptive video streams can consume substantial network bandwidth, encoder resources, file storage, and/or other resources. Conventionally, multiple multicast streams of the same program having different encoding parameters (e.g., bit rate, frame rate, resolution, etc.) were simultaneously provided for each media program. That is, each program would typically be simultaneously multicast as a high bandwidth stream, a low bandwidth stream and/or any number of intermediate bandwidth streams. Client media players operated by viewers simply tuned in to the program stream having the best set of parameters for then-current playback conditions. If a playback began to lag, then the media player would typically switch to a lower bandwidth stream (e.g., a stream having lower bit rate, frame rate, resolution and/or other parameters). When conditions were able to support a higher bandwidth stream, then the player would adaptively switch to a different stream that contained the same programming encoded with different parameters. Again, however, this typically requires multiple simultaneous multicasts of each program, since each program needs to be available at different bandwidths for different clients. The multiple streams for each of the multiple programs can consume a relatively large amount of bandwidth very quickly.

Various embodiments are able to effectively manage network resources during multicast delivery by temporarily discontinuing certain streams in response to then-current network conditions and/or in response to customer demand. Rather than simply providing a full range of different-bandwidth copies of each program at all times, a computer can automatically select only those streams that are actually in demand, or that have the greatest demand. Copies of programs having little or no demand can be temporarily suspended to make resources available to other streams. Viewers of suspended streams can be redirected to use streams having different parameters (e.g., a slightly higher or lower bandwidth stream containing the same program), and/or to obtain the stream from another source. Real-time feedback about then-current demand for the various streams can therefore be used to ensure that those streams having the greatest demand receive an adequate allocation of resources, thereby improving the user experience for the greater share of then-current users.

Figure 1:
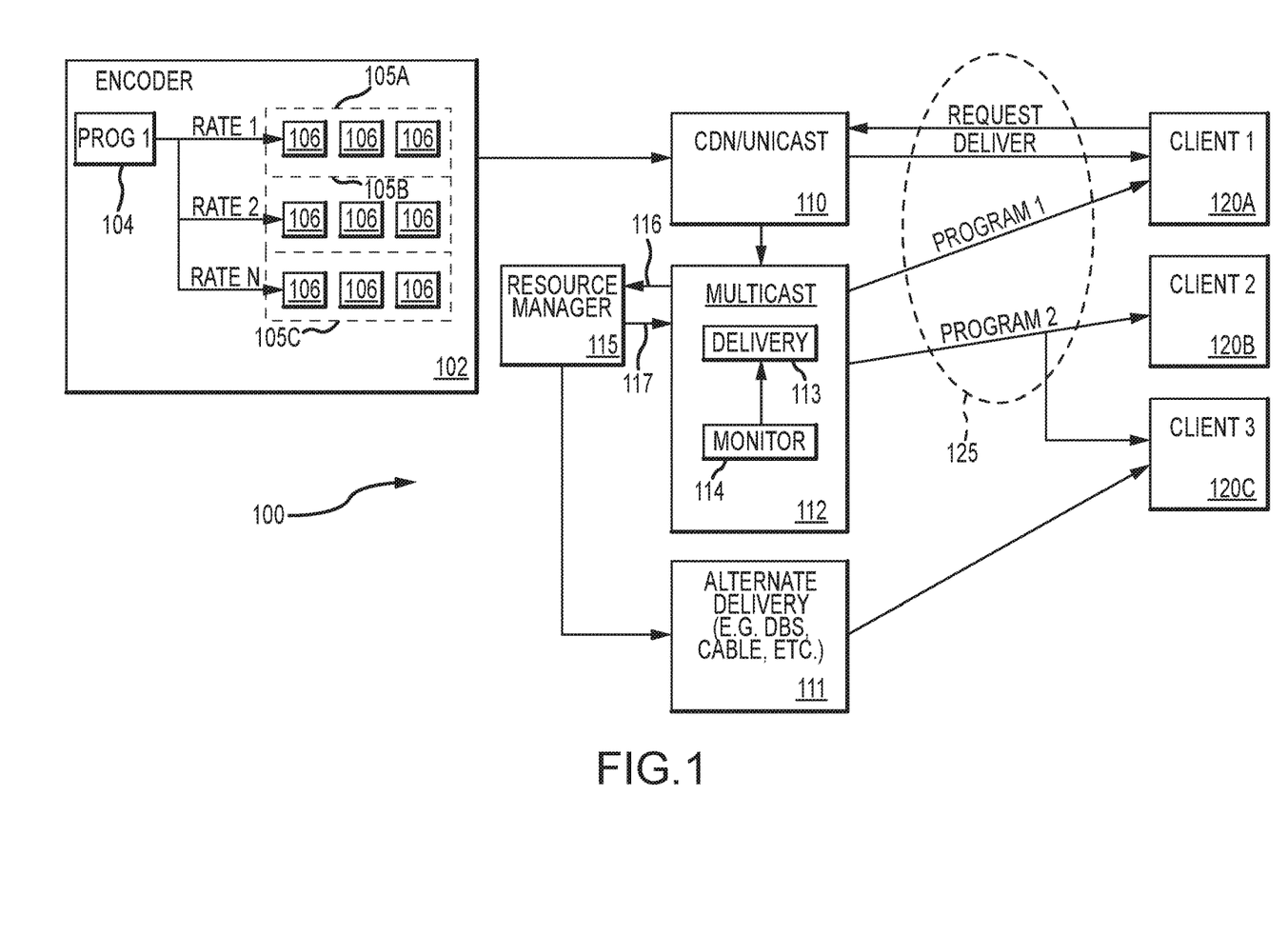
FIG. 1 is a block diagram of an exemplary system for adaptively managing the multicast delivery of multiple media streams.

Turning now to the drawing figures and with initial reference to FIG. 1, an exemplary system 100 to adaptively manage the multi-cast delivery of media streams suitably includes an encoder 102, a multicast delivery server 112, and a resource management system 115. Various embodiments may additionally include a unicast delivery server 110 and/or an interface 111 to an alternate delivery system (e.g., cable television, broadcast television, direct broadcast satellite (DBS), and/or the like). The various components shown in FIG. 1 may be jointly provided by a common service provider, or different service providers may work together to provide different components of the system 100. A television network or other content provider could provide content that is already encoded in the appropriate formats, for example, thereby obviating the need for a separate encoder 102 in some implementations. Similarly, unicast and/or multicast hosting could be performed by any sort of content delivery network (CDN) or other service, as appropriate. Still further, the resource management service 115 could be equivalently combined into the encoder 102, the multicast hosting service 112, and/or any other service as desired.

Encoder 102 is any device or service capable of encoding media programs 104 into one or more adaptive streams 105A-C. In the exemplary embodiment shown in FIG. 1, encoder 102 is a digital computer system that is programmed to create multiple streams 105A-C that each represent a media program 104 in its entirety. Typically, each stream 105A-C is made up of smaller segments 106 that represent a small portion of the program in a single data file. Each stream 105A-C is typically encoded so that segments 106 of the different streams 105A-C are interchangeable with each other. That is, a client media player 120A-C can mix and match segments 106 from different streams 105A-C to continue seamless playback even as network conditions or other resources change.

For unicast (one-to-one) distribution, the sets of segments 106 making up each stream 105 are stored on a content delivery network (CDN) or other server for distribution on the Internet or another network 125. Typically, a media player application executing on one or more client devices 120A-C contains intelligent logic to select appropriate segments 106 as needed to obtain and playback the media program 104. As noted above, segments 106 may be interchangeable between streams 105 so that higher bandwidth segments 106 may be seamlessly intermixed with lower bandwidth segments 106 to reflect changing network or other conditions in delivery over network 125. In some implementations, the media player 120 initially obtains a digest or other description of the available segments so that the player itself can request the segments 106 as needed. Often, such requests can be processed using conventional hypertext transport protocol (HTTP) constructs that are readily routable on network 125 and that can be served by conventional CDN or other web-type servers 110. Media player 120 may issue conventional HTTP "get" instructions for particular segment files 106 hosted by a CDN 110, for example. CDN 110 would respond with the appropriate segment files 106 using conventional HTTP "put" statements, as appropriate.

In a multicast setting, client devices 120A-C similarly obtain encoded segments 106 from a service 112 via network 125. Typically, however, multicast segments 106 are simultaneously pushed to multiple client devices 120A-C. The media player at the client device 120 retains some control over the received content, however, by switching between different streams 105A-C of segments 106 as needed. That is, multicast server 112 provides simultaneous streams 105 of segments 106 for each program being broadcast so that the different client devices 120A-C are each able to obtain segments 106 of the program with the appropriate encoding parameters for the then-current conditions, as determined by client devices 120A-C. Again, this typically entails service 112 providing multiple simultaneous streams 105 for each program 104 so that the various devices 120A-C can switch between any of the available streams 105A-C as needed.

Multicast server 112 suitably includes appropriate computer hardware (e.g., a processor, memory and input/output interfaces) executing appropriate software to support the various functions described herein. Delivery function 113 may be implemented using, for example, conventional web server, media streaming and multi-casting techniques and structures (e.g, HTTP or the like). Multicast server 112 also provides a monitoring function 114 that can be used to provide feedback 116 to the resource management service 115. In various embodiments, function 114 tracks which streams 106 for the various programs 104 are being used or not used so that unused or lightly-used streams 106 can be identified. Demand for each stream 105A-C may be identified by tracking the number of HTTP requests received for segments 106 associated with each stream, or in any other manner. Function 114 may alternately or additionally track network bandwidth, processor utilization and/or other resources that could impact delivery of multi-cast streams 106 to clients 120A-C, and this information could be incorporated into feedback 116.

Resource management service 115 is a computerized service that automatically adapts the multicast delivery of media streams 105 in response to feedback information 116. In many implementations, resource management service 115 executes on a conventional digital computer that includes a processor, memory, input/output interfaces and the like. Some embodiments may perform the resource management function of service 115 with the same hardware used to perform the encoding and/or multicast delivery functions, as desired. Resource manager 115 as shown in FIG. 1 could be equivalently combined with unicast server 110, multicast server 112, encoder 102 and/or other services as desired.

When feedback information 116 indicates that one or more streams are unused (or only lightly used), then lightly-used stream may be temporarily (or permanently) discontinued from further delivery to conserve bandwidth or other resources. Similarly, when network bandwidth or other resources available to multicast delivery service 112 become constrained or otherwise unavailable, then the lesser-used streams may be temporarily or permanently discontinued to conserve the resources that are available.

In some embodiments, the encoding function may also be adapted to conserve encoding resources used in streaming live broadcast programming or the like. To that end, various embodiments allow real-time encoding of one or more streams 105A-C to be temporarily suspended to preserve resources for more popular streams 105A-C. This may be particular useful during multicasts of live broadcasts such as sporting events. If demand for a particular stream 105A-C is identified as being particularly low at a given time, for example, then encoding of that stream 105 could be temporarily suspended to preserve encoder capabilities for other, more popular streams 105.

The particular streams 105 that are discontinued may be determined in any manner. In some implementations, higher or intermediate bandwidth streams may be discontinued while a lower bandwidth stream remains available, thereby allowing viewers to continue watching the program 104, albeit at lower quality. Media player applications executing on client devices 120A-C may be notified of changes in the available streams 105 for a particular program 104 by sending a new digest, or through other in-band or out-of-band signaling as appropriate.

Some embodiments may further allow discontinued streams to be provided in alternate ways. A discontinued stream may be redirected from delivery over network 125 to delivery over a television service via interface 111, for example. In such embodiments, the client device 120A-C obtains the discontinued signal via a cable television, broadcast television, DBS or other signal as appropriate. In other implementations, the client device 120A-C receives an instruction to obtain the discontinued stream from a unicast source 110, if such a source is available that has access to the needed stream and program.

Streams may be discontinued in any manner; various embodiments may provide an instruction 117 to direct the delivery function to cease further delivery of the discontinued stream. In some implementations, delivery service 113 simply provides a predetermined code in response to HTTP requests for discontinued segments 106. The code could be, for example, an HTTP error code or the like that notifies the requesting client device that the requested stream 105 is no longer available. Further, some embodiments could configure client devices 120A-C to recognize alternate streams or sources of the suspended content from the received error codes. Rather than simply providing a "requested content not available" (e.g., HTTP 204/404 error), for example, server 112 could instead provide an error code that directs the client 120 to request a higher or lower bandwidth, or to obtain the content from an alternate source (e.g., unicast server 110, a television/cable/DBS broadcast, or any other source). Software executing on client devices 120A-C could therefore be configured to recognize particular error codes contained in HTTP or other responses provided by server 112, and to react accordingly.

Figure 2:
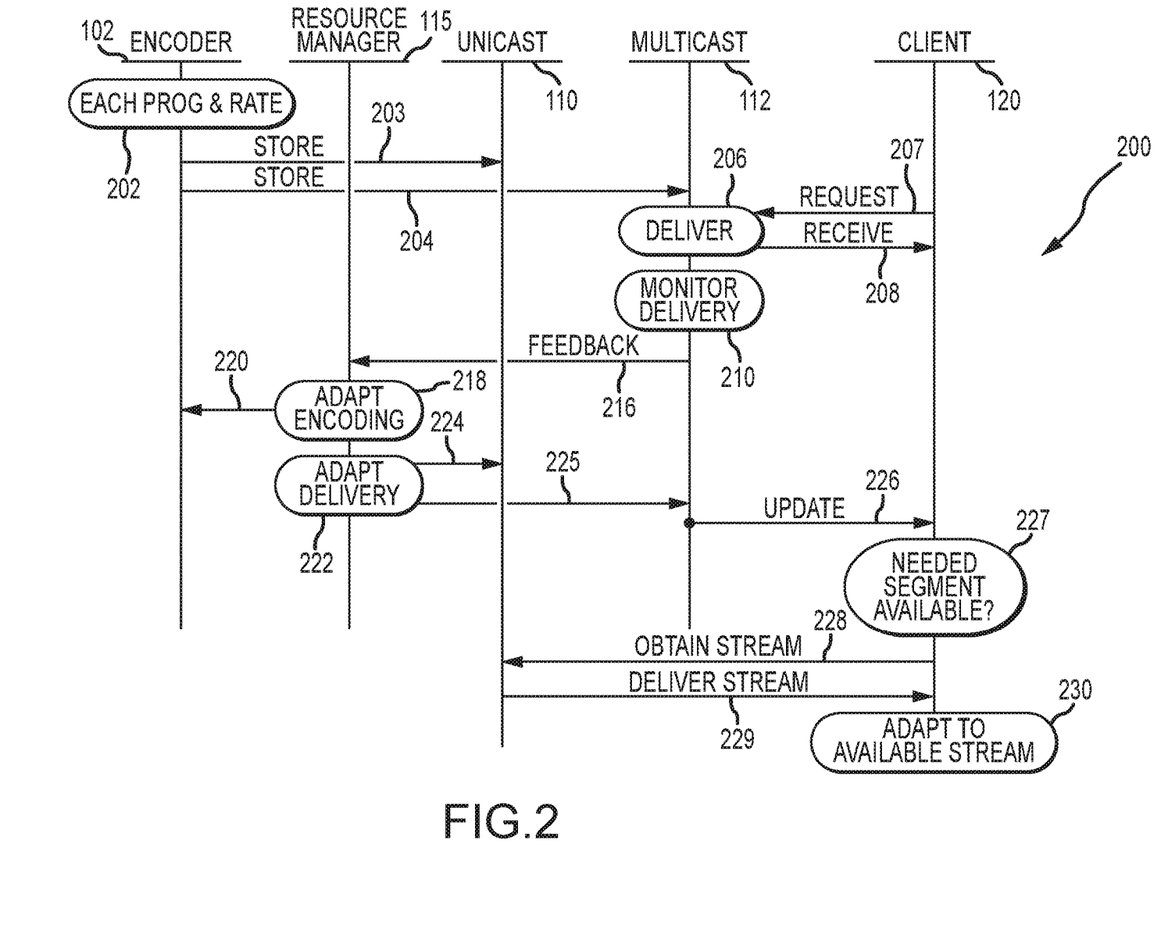
FIG. 2 is a message flow diagram showing an exemplary process for adaptively managing the multicast delivery of multiple media streams.

FIG. 2 shows an exemplary process 200 for adapting multicast delivery of media streams. With reference now to FIG. 2, the encoder 102 suitably encodes the various programs 104 at each data rate (or other parameter) supported within system 100 (function 202). As noted previously, each program may be encoded into any number of different streams 105 having any number of different encoding parameters. The various streams 105 are then stored on a unicast server 100 (function 203) and/or multicast server 112 (function 204) as desired for delivery to the various clients 120, as desired.

The client 120 suitably obtains the appropriate media stream using conventional adaptive streaming techniques. In various embodiments, client 120 requests streamlets or other segments 106 of an appropriate stream 105 for a desired program 104, as desired. The particular segments 106 and/or streams 105 can be identified through a digest or other summary provided by the appropriate server 110, 112, or by another source as desired. In many implementations, the various segments 106 can be referenced using conventional uniform resource locators (URLs) or other addresses that conform to a standard format, or that are otherwise indicated in digest or similar summary. In such implementations, the client 120 suitably requests (function 207) the appropriate segment 106, and a delivery module 113 (function 206) of server 112 responds with the requested segment (function 208). The client 120 can request segments 106 corresponding to different programs 104 and/or other available streams 105 that are associated with the same program 104 as conditions warrant.

As noted above, multicast server 112 suitably monitors the streams 105 that are being delivered (function 210) so that feedback 216 can be provided to the resource manager 115. Generally, monitoring function 114 of the multicast server 112 is able to monitor which streams 105 are currently in use by tracking requests 207 and/or transmissions 208, as desired.

Feedback 216 suitably indicates the current state of multicast delivery to the resource manager 115. In various embodiments, feedback 216 reflects real time demand for the different streams 105 and/or the then current conditions of server 112 and/or network 115. Resource manager 115 processes the feedback data 216 to determine whether to adapt the encoding of the stream (function 218) and/or the delivery of the stream (function 222). In some implementations (e.g., when a live broadcast is encoded in real time as it is being streamed on network 125), the encoding of certain streams 105 can be suspended at least temporarily to conserve encoding or delivering capability. This could be accomplished by sending an instruction 220 to suspend encoding by encoder 112, as appropriate.

Even if the lower-demand stream 105 has already been encoded, however, it may still be beneficial to suspend delivery of the stream when conditions warrant. This may be accomplished by sending a message 225 to the multicast server 112, as appropriate. The resource manager 115 may also communicate with unicast server 100 (function 224) to suspend delivery of one or more streams, to notify the server 100 that certain streams 105 will no longer be available from multicast server 112, or for any other purpose. Server 112 will subsequently cease delivery of segments 106 associated with the suspended streams. Subsequent messages 225 could indicate that delivery of one or more suspended streams 105A-C should be restarted, as appropriate.

The delivery module 113 of multicast server 112 notifies relevant clients 120 when certain streams 105 are no longer available (function 226). This update may provide a new digest, or other information that lets client 120 become aware of other ways to obtain similar content (e.g., the same program encoded with different parameters). Equivalently, function 226 could involve providing an HTTP or similar code to the requesting client 120 in response to subsequent requests for suspended segments 106. As discussed above, the codes provided in response to such requests could be selected to provide clients 120A-C with additional information about how to obtain replacement content, as desired.

As noted above, it may be desirable in many instances to suspend higher bandwidth streams 105 (or intermediate bandwidth streams 105) of certain programs 104 since these will produce greater bandwidth savings. Even if a desired bandwidth stream 105 becomes unavailable (function 227), the client 120 may be able to nevertheless request a different stream 105 (function 228) to obtain a stream 105 that encodes the same program 104 with different encoder settings (e.g., at a slightly higher or lower bandwidth). The client 120 is therefore able to seamlessly adapt to the available streams 105 with little or no perceived interruption in the playback of the program 104 to the viewer (function 230). As noted above, other embodiments may alternately or additionally notify the client (e.g., with function 226) that the discontinued stream 105 is available from a unicast source (e.g., server 110) and/or from a different broadcast source (e.g., via cable, broadcast or DBS interface 111). The various functions shown in FIG. 2 may be supplemented, modified or differently ordered in any manner to create any number of equivalent embodiments.

Figure 3:
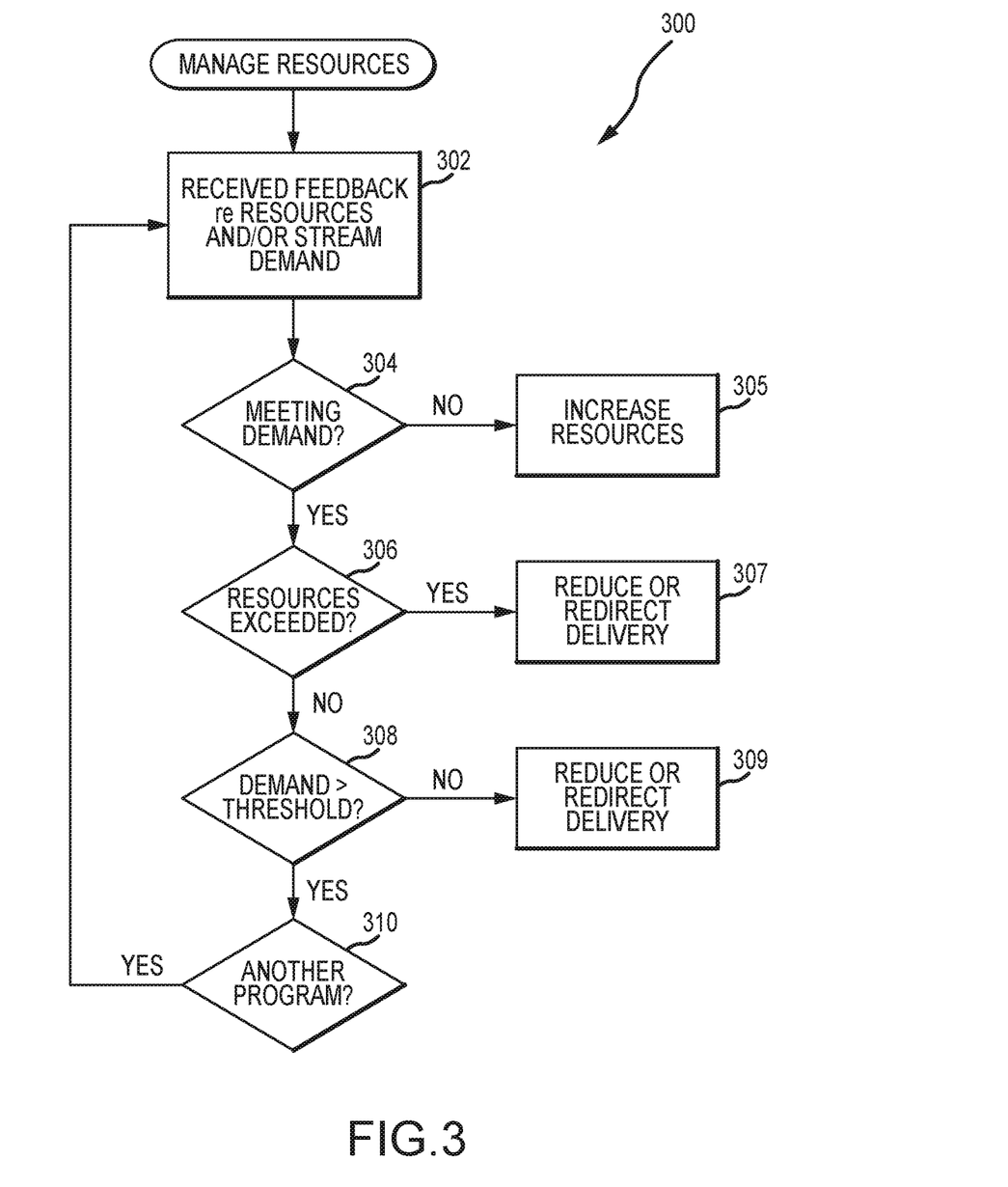
FIG. 3 is a flowchart of an exemplary process executable by a resource management system for adaptively managing network resources in a multicast media delivery environment.

Turning now to FIG. 3, an exemplary process 300 to manage resources in a multicasting streaming system 100 suitably includes various functions 302-310 that can be carried out using programmable software code executed by a computer system, such as resource management system 115. The software code used to implement the various functions may be stored in memory, disk storage or other non-transitory storage available to the computer system, and may be executed by any conventional microprocessor, microcontroller or other programmable circuitry. Equivalent embodiments may supplement, modify and/or differently arrange the various functions shown in FIG. 3 in any manner.

Process 300 suitably involves receiving real-time or other feedback data 116 from the multicast delivery service 112 (function 302). In many implementations, the feedback data 116 indicates the real-time demand for various streams 105, and/or otherwise indicates the then-current demands placed upon the multicast delivery service 112. If the then-current demand is not being met, then it may be desirable to increase resources for one or more streams by providing additional streams (function 305) of varying encoding parameters, or providing multiple copies of the highly-demanded stream.

Conversely, if the network bandwidth, server capacity or other computing resources are exceeded (function 306), then it may be beneficial to identify one or more streams 105 that can be discontinued or redirected (function 307). Various embodiments may consider whether sufficient server capacity and/or network bandwidth is available before increasing the number of streams in function 305. Such embodiments may also look for lower demand streams 105 of the same program or of a different program 104 that can be suspended to make extra resources available for high-demand streams 105. As noted above, suspended streams may be redirected for delivery via unicast or other channels in some implementations.

Even if sufficient resources do remain available, it may be desirable to suspend those streams that are currently experiencing low or no demand (function 308). In various embodiments, the number of current stream recipients can be compared to a threshold value to determine whether the stream should be continued. If the number of recipients dips below the threshold, then the stream may be suspended, and those clients 120 that are currently receiving the stream may be redirected to a different stream (e.g., a lower bandwidth stream) and/or a different source for the discontinued stream (function 309). Process 300 or any portion thereof may be repeated for any number of different programs 104 or streams 105 (function 310), as desired.

The foregoing discussion therefore considers whether particular streams 105A-C that are provided as part of a multicast streaming service can be adaptively managed to provide efficient use of server resources while still preserving better performance for most users. The general concepts set forth herein may be adapted to any number of equivalent embodiments. Although the discussion herein frequently considers network 125 to be the Internet or a similar network, for example, equivalent concepts could be applied to telephone, cable television, DBS networks and/or the like to allocate media streams distributed in those environments. Equivalent concepts could, for example, allocate bandwidth on a cable or DBS network according to monitored or estimated demand. Many other enhancements, modifications and other changes could be made in a wide array of alternate but equivalent embodiments.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method executable by a computer system to adaptively manage the multicast delivery of a live media program to a plurality of client devices, wherein the method comprises:
   encoding the live media program by the computer system in real time to create a number of encoded streams each representing the live media program, wherein each of the encoded streams has different encoding parameters than the other streams of the live media program, and wherein the number of encoded streams is at least two;
   receiving feedback about the delivery of each of the encoded streams by the computer system; and
   adapting, by the computer system, the number of streams encoded for at least one of the multiple media programs in response to the received feedback so that the encoding and delivery of at least one of the more popular encoded streams is continued while the encoding of at least one of the less popular encoded streams is terminated.

2. The method of claim 1 wherein each of the encoded streams represents a copy of the same live media program encoded with a different bit rate.

3. The method of claim 1 wherein the adapting comprises encoding fewer streams of the live media program when the feedback indicates a decrease in available bandwidth.

4. The method of claim 3 wherein the adapting comprises directing that at least one of the plurality of client devices use a different encoded stream of the live media program when the encoding of the encoded stream previously used by the at least one of the plurality of client devices is terminated.

5. The method of claim 3 further comprising the computer system directing that terminated streams be provided instead over a different delivery medium.

6. The method of claim 5 when the different delivery medium is a direct broadcast satellite medium.

7. The method of claim 1 wherein the encoding and adapting are performed in real time by the computer as the number of encoded streams of the live media program are delivered to clients.

8. The method of claim 1 wherein the feedback comprises demand information describing a real-time demand for each of the number of encoded streams, and wherein the adapting comprises discontinuing delivery of at least one encoded stream if the real-time demand for the at least one encoded stream is less than a threshold value.

9. The method of claim 8 wherein the feedback is provided by a multicast delivery server, and wherein the adapting comprises the computer system communicating with the multicast delivery server to discontinue the delivery of the at least one encoded stream of the live media program.

10. The method of claim 8 wherein the adapting comprises initiating an instruction to at least one of the client devices receiving a less popular encoded stream of the live media program that directs the at least one client device to subsequently obtain the terminated stream of the media program from a unicast delivery source that is different from the multicast delivery server.

11. The method of claim 1 wherein segments of the streams are delivered in response to HTTP requests received from the plurality of client devices.

12. The method of claim 11 wherein the adapting comprises responding to the HTTP requests for the segments of terminated streams by providing an HTTP code indicating that the terminated stream is no longer available.

13. The method of claim 12 wherein the HTTP code indicates an alternate source for the same content contained in the terminated stream.

14. A computer system having a processor and a memory, wherein the processor is configured to adaptively manage the multicast delivery of a live media program that is encoded in real time into a plurality of streams, each stream made up of segments having different encoding parameters than the segments of the other streams of the live media program, and wherein the processor is further configured to adaptively manage the multicast delivery of the live media program to a plurality of client devices via a network by:
receiving requests from the plurality of client devices via the network, wherein each of the requests identify at least one of the plurality of streams;
delivering the segments associated with each of the streams in response to the requests received from the plurality of client devices via the network;
monitoring the number of requests received for each of the plurality of streams of the live media program; and
adapting a number of the streams of the live media program that are encoded for delivery to the plurality of client devices in response to the monitored number of requests so that encoding and delivery of at least one of the more popular encoded streams of the live media program is continued while encoding and delivery of at least one of the less popular encoded streams of the live media program is terminated.

15. The computer system of claim 14 wherein segments of the streams are delivered in response to HTTP requests received from the plurality of client devices.

16. The computer system of claim 15 wherein the adapting comprises responding to the HTTP requests for the segments of terminated streams by providing an HTTP code indicating that the terminated stream is no longer available.

17. The computer system of claim 16 wherein the HTTP code indicates an alternate source for the same content contained in the terminated stream.

18. A data processing system comprising:
an encoding system configured to produce a plurality of streams of a live media program in real time as the live media program is received, wherein each of the plurality of encoded streams represents a copy of the same live media program encoded using a different encoding parameter;
a multicast delivery system configured to provide multicast delivery of the plurality of encoded streams to each of a plurality of clients, to monitor the multicast delivery of the plurality of streams, and to provide feedback about the monitored delivery of the plurality of media streams; and
a resource management system configured to receive the feedback about the monitored delivery of the plurality of media streams and, responsive to the feedback, to adapt a number of the plurality of media streams representing the media program that are encoded by the content delivery system so that delivery of at least one of the more popular encoded streams of the live media program is continued while encoding and delivery of at least one of the less popular encoded streams of the live media program is terminated.

19. The data processing system of claim 18 wherein the feedback describes demand for each of the plurality of media streams representing the live media program, and wherein the resource management system is configured to adapt the plurality of media streams by directing the multicast delivery system to temporarily terminate delivery of streams of the media program having demand below a threshold.

20. The data processing system of claim 19 wherein the streams are delivered in response to HTTP requests received from the clients, wherein the multicast delivery system responds to the HTTP requests for terminated streams with an HTTP code indicating that the terminated stream is no longer available, and wherein the HTTP code indicates an alternate source for the same content contained in the terminated stream.

* * * * *